Aug. 6, 1946.          A. COOPER ET AL          2,405,345
MANUFACTURE OF EXPANDED THERMOPLASTIC RESINOUS COMPOSITIONS
Filed Dec. 30, 1944

Inventors
Alfred Cooper
Douglas E. Partington
By
Attorney

Patented Aug. 6, 1946

2,405,345

UNITED STATES PATENT OFFICE 2,405,345

MANUFACTURE OF EXPANDED THERMO-PLASTIC RESINOUS COMPOSITIONS

Alfred Cooper and Douglas Edwin Partington, Croydon, England, assignors to Expanded Rubber Company Limited, Croydon, England Application December 30, 1944, Serial No. 570,789
In Great Britain January 10, 1944

2 Claims. (Cl. 18—48)

This invention relates to the production of cellular materials and it is an object of the invention to produce such materials from thermoplastic moulding compositions, i. e. compositions which soften on heating and harden again on cooling as distinct from thermosetting compositions which on continued heating harden. Thermoplastic compositions comprise many well known groups of moulding materials, i. e. natural resins, cellulose derivatives, polyvinyl compounds and casein plastics, each of which have special properties which a cellular structure is able to enhance.

Thus the natural resins, in particular shellac, and bitumen and polyvinyl compounds, have electrical insulation properties, and cellulose derivatives have constructional qualities and casein in its freedom from taste and smell is adapted for heat insulation purposes where food is concerned, and in each case these properties are enhanced if the material has a cellular structure, in particular a closed cell structure, though the invention is not limited to the production of a closed cell structure but includes the so-called sponge or open cell structure which is produced in a similar manner except that for an open cell structure the gas bubbles when formed are allowed to escape from the material while it is sufficiently plastic to allow the escape of gas and the formation of communicating channels between the cells without being too plastic to retain its cellular structure. These matters are well known to those engaged in the production of cellular materials from plastics. The chief uses for these expanded thermoplastic materials are in connection with thermal and electrical insulation and buoyancy purposes and as a light weight constructional material which would have numerous applications in the aircraft industry, and as prefabricated panels in building and housing construction, and whenever it is desirable to reduce the apparent density of thermoplastic material, as for example for economic reasons.

These stiff doughs of thermoplastic materials are produced in the ordinary course of manufacture by what is often referred to as the "Celluloid" process because it was first employed in the manufacture of the oldest artificial plastic. In this process the plastic "hides" which are formed when the thermoplastic—suitably plasticised—is milled or worked up on hot rolls are piled up into slabs 6 inches or 1 foot high and subjected to high pressures at somewhat elevated temperatures for several hours. Thereupon the solid block thus formed is sliced in a slicing machine to sheets of uniform thickness. The sheets, however, retain throughout this process a certain amount of the plasticising solvent and the presence of this solvent enables the plastic to absorb gases such as air, nitrogen, carbon dioxide or other inert gases without incorporating any further amount of solvent. These "unseasoned" sheets may be stored indefinitely in sealed drums or containers from which they can be removed for use as required.

Where, however, the starting material is the unplasticised resinous composition, it is first necessary to produce the stiff dough by plasticising the composition with a solvent or swelling agent until a stiff dough is obtained.

This invention is illustrated in the accompanying drawing, in which.

Figure 1:
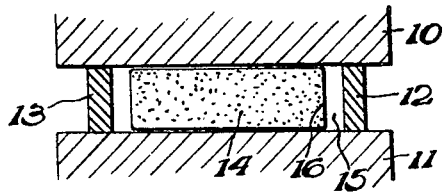
Figure 1 is a sectional view showing a slab of material in position before the application of pressure.
Figure 2:
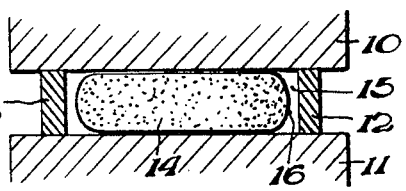
Figure 2 is a similar view showing the slab under the applied heat and pressure.
Figure 3:
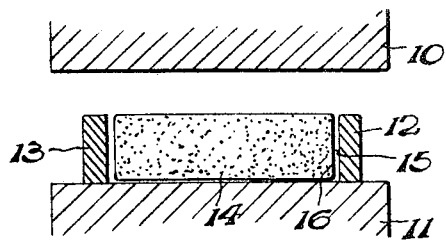
Figure 3 is a similar view showing the position of the slab following the relief of the pressure.
Figure 4:
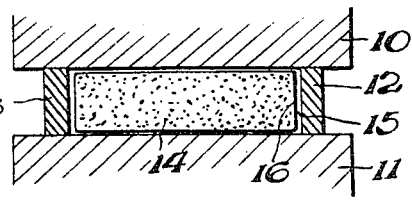
Figure 4 shows a similar view showing the position of the slab following reapplication of pressure to a degree to finally straighten the upper and lower surfaces of the slab.

In our co-pending application No. 543,424, a process for the production of expanded thermoplastic resinous compositions is described and claimed which comprises impregnating with an inert gas under pressure a stiff dough consisting of a thermoplastic resinous composition plasticised with a solvent or swelling agent which can be removed below the softening temperature of the composition, reducing the pressure to expand the dough and removing the plasticising agent sufficiently to attain the required hardness of the plastic. Finally the material may be remoulded between the platens of a warm press which is subsequently cooled before the material is removed from it. In carrying out the said process it has been customary to sheet out the dough in a mill or calender, or by slicing from a block to obtain a definite and even thickness and before applying the gassing treatment suitable to give any desired thickness of the expanded material.

Although the final thickness of the expanded sheet depends on the thickness of the dough sheeted as above described, to a great extent, it is difficult, if not impossible, to control the expansion to give a perfectly flat expanded sheet on account of the varying amounts of residual solvent the material contains, and the possibility of slight gas diffusion taking place during the final seasoning period, when the material is hardened by the removal of plasticising material. On this account the re-moulding step above referred to, when the material is pressed between the platens of a warm press and cooled, has been found necessary. For this purpose the material has been placed in a picture-frame mould with a slight margin for flow, with the material filling the thickness of the mould precisely. The pressure has then been applied, and the material pressed for ten minutes, whereupon it is cooled before removal.

It has now been found that a great improvement in the lightness of the material can be effected by a modified procedure in this re-moulding or re-pressing operation.

According to the present invention the stiff dough of thermoplastic material milled or sliced into a sheet of substantially uniform thickness and expanded and hardened is submitted to a re-moulding or pressing operation at a temperature sufficient to soften the material to allow of limited further expansion, in which the material is placed between the platens of a press adapted by the insertion of rigid distance pieces or like device for controlling the movement of the ram to give the desired thickness while leaving the edges of the expanded sheet free to expand further or flow slightly; interrupting the operation by releasing the pressure and finally re-applying the pressure, cooling and releasing the material. Thus instead of pressing the expanded and hardened sheet for 10 minutes in a single operation, the pressing may be interrupted after 5 minutes while the material is still warm and then the pressure re-applied for a further 5 minutes, whereupon the platens are cooled and the material removed.

This interruption of the pressing operation and the greater freedom for expansion and flow at the edges results in a much lighter density material being obtained.

Results have shown that by this process boards that would have been moulded and finished to provide a density of 8 lbs. per cubic foot can now be as light as 5 lbs. per cubic foot.

What we claim is:

1. A process for re-pressing or shaping of cellular thermoplastic sheets produced by expansion of gas impregnated thermoplastic material which comprises placing the said sheets between the platens of a press provided with rigid distance pieces to arrest the movement of the ram when the desired thickness is attained and heating to a temperature sufficient to soften the said thermoplastic enough to allow of further expansion, the edges of the said sheet being free to expand and flow further, interrupting the operation by releasing the pressure and finally re-applying the pressure and cooling before removal from the press.

2. A process for the production of cellular thermoplastic resinous sheets which comprises sheeting and impregnating with an inert gas under pressure a stiff dough consisting of a thermoplastic resinous composition plasticised with a swelling agent which can be removed at temperatures below the softening temperature of the composition; reducing the pressure to expand the dough; removing the plasticising agent sufficiently to attain the required hardness of the plastic; submitting the thus expanded material to a pressing operation at a temperature sufficient to soften the material and to allow of limited further expansion by placing it between the platens of a press adapted by the insertion of rigid distance pieces to arrest the movement of the ram when the desired thickness is attained while leaving the edges of the expanded sheet free to expand and flow further; interrupting the operation by releasing the pressure and finally reapplying the pressure and cooling before removal from the press.

ALFRED COOPER.
DOUGLAS EDWIN PARTINGTON.